July 10, 1923.  
I. M. HAYWARD  
TORCH  
Filed Dec. 6, 1921
1,461,658
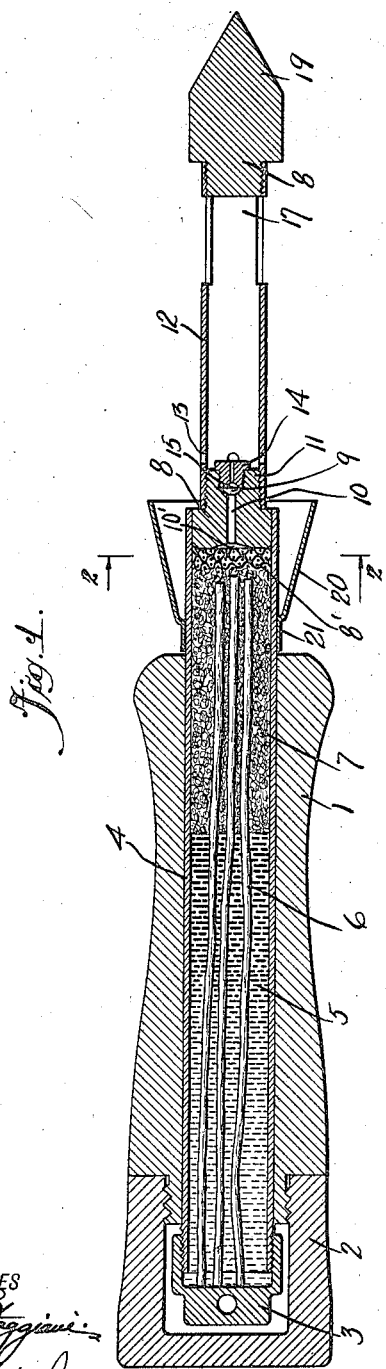
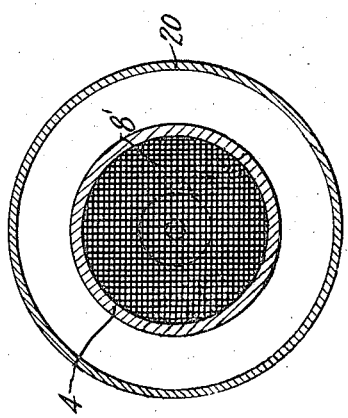
WITNESSES
INVENTOR  
IRVING M. HAYWARD  
BY  
ATTORNEYS Patented July 10, 1923.

1,461,658

UNITED STATES PATENT OFFICE.

IRVING M. HAYWARD, OF BROOKLYN, NEW YORK.

TORCH.

Application filed December 6, 1921. Serial No. 520,309.

*To all whom it may concern:*

Be it known that I, IRVING M. HAYWARD, a citizen of the United States, and a resident of the city of New York, borough of Brooklyn, in the county of Kings and State of New York, have invented a new and Improved Torch, of which the following is a full, clear, and exact description.

This invention relates to an improved torch and has for an object to provide a construction which may be quickly arranged as a torch or arranged as an automatically heated soldering iron.

Another object in view is to provide a torch wherein alcohol may be readily used as a fuel.

Another object of the invention is to provide a construction of torch formed with an annular priming cup and an annular generating chamber.

A still further object of the invention is to provide a torch wherein packing is used and so arranged as to prevent the heat from unduly affecting the liquid part of the fuel while at the same time presenting means for conveying the fuel to the heated part of the torch for gasification.

In the accompanying drawing—

Figure 1 is a longitudinal vertical section through a torch disclosing an embodiment of the invention.

Figure 2 is a sectional view through Figure 1 approximately on line 2—2, the same being on an enlarged scale.

Referring to the accompanying drawing by numerals, 1 indicates a handle which may be of wood or other desired material having a removable end 2 covering the cap 3 threaded onto the tubular container 4. The container 4 is constructed of metal and is adapted to contain a quantity of fuel 5 which fuel is preferably alcohol which may readily travel along the wicks 6, which wicks are of any suitable fabric which will cause the fuel to travel into the packing 7, which packing is preferably of asbestos. A generating head 8 is forced into the end of the container 4 and held therein by friction preferably, said generating head being provided with a bore 9 in which the tip 14 is threaded, said tip having a suitable small passage-way extending therethrough, which passage-way merges into the concave portion 15. The bore 9 merges into the central bore 10 which in turn merges into a concaved or depressed portion 10' whereby gas may freely pass through the bore or passage-way 10. A plurality of layers of wire mesh 8' co-act with member 8 for producing a gas generating device which is assisted by asbestos filling 7. By providing layers of wire mesh 8' as shown in Figure 1, the gas may freely pass laterally into the bore or passage-way 10 and thereby provide an ample volume or ready discharge through the tip 14. Arranged adjacent the tip 14 is a number of apertures 13 whereby a supply of air is provided for the gas immediately upon its escape from the tip. The burner tube 12 is also provided with a number of air slots 17, said slots being preferably three in number so that a draught transversely cannot blow out the flame.

The extreme outer end of the tube 12 is internally threaded for receiving a threaded extension 18 of the soldering iron or tip 19. Whenever the device is to be used as a soldering iron, the parts are arranged as shown in Figure 1 but in case it should be desired to use the device as a torch, the tip 19 is unscrewed and the flame will project beyond the tube 12 a short distance. The arrangement of the openings 13, and slot 17, permits the closing of the end of the tube 12 by the tip 19 or permits the removal of said tip without affecting the mixture of the air and gas, and consequently, without affecting the production of the flame when the tip is in place. The flame is discharged directly against the end of the extension 18 and glances outwardly through the slot 17 whereby the tip is maintained at a constant heat.

In regard to the generation of gas from the alcohol or other fuel, it will be noted that the packing 7 causes a preliminary generation while the layer of wire mesh 8' will complete the gasification of the fuel before it is discharged out through tip 14. The chamber 15 and tip 14 permits the accumulation of a certain amount of gas so that a constant stream will be discharged through the passage-way in the tip for maintaining the flame. In order to heat the generating member 8 and associated parts when starting the torch, a priming cup 20 is provided. which cup is an annular structure provided with a restricted clamping section 21 made of such a diameter as to snugly fit and press against the container 4 whereby the cup is firmly held in place.

When starting the torch, it is preferably set on the removable end 2 of the tip extending upwardly and a quantity of alcohol or other fuel is deposited in the cup 20 and ignited. This will produce a flame entirely around the upper end of the container 4, generating head 8 and associated parts whereby an even heating will be produced in a minimum time.

It will be noted that the device is very simply constructed and that no valves are provided for turning on or shutting off the fuel. In case it should be desired to put out the torch before the fuel has been exhausted, it may be readily put out by blowing against the same, preferably through the apertures 13. As the member 8 and associated parts are warm, a small amount of gas will be discharged for a short time but not enough to be objectionable.

What I claim is:—

1. A self heating tool comprising a combined fuel reservoir and vaporizing chamber, and a container co-acting with the walls of said reservoir to retain a quantity of preheating fuel.

2. A self heating tool comprising a combined fuel reservoir and vaporizing chamber, a container surrounding and co-acting with the walls of said reservoir to hold a quantity of preheating fuel.

3. A self heating tool comprising a fuel reservoir, a wick arranged therein, and a container co-operating with the walls of the reservoir adjacent the wick to hold a quantity of preheating fuel.

4. A self heating tool, comprising a fuel reservoir, a generating head, a burner, and a container surrounding one end of said reservoir and the generating head, said container being a conical-shaped member formed with an annular gripping ring adapted to tightly grip said reservoir.

5. A self heating tool, comprising a reservoir for receiving liquid fuel, a wick arranged in said reservoir extending substantially the full length of the reservoir, a filling of asbestos arranged in said reservoir and filling the same from near one end for an appreciable distance toward the opposite end, said wick extending into said asbestos, a plurality of layers of wire mesh arranged at one end of the asbestos and within said reservoir, a generating head fitted into one end of the reservoir and arranged adjacent said wire mesh, said head having a passage-way extending therethrough, a removable tip carried by said head and acting as a discharge member for the gas generated in said asbestos and wire mesh, and a burner extending forwardly from said generating head.

IRVING M. HAYWARD.